US009806941B2

(12) United States Patent
Wouhaybi et al.

(10) Patent No.: US 9,806,941 B2
(45) Date of Patent: Oct. 31, 2017

(54) SYSTEMS AND METHODS FOR THE MANAGEMENT AND DISTRIBUTION OF SETTINGS

(75) Inventors: Rita H. Wouhaybi, Portland, OR (US); Tobias M. Kohlenberg, Portland, OR (US); Stanley Mo, Hillsboro, OR (US); Mubashir A. Mian, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 164 days.

(21) Appl. No.: 13/997,348

(22) PCT Filed: Dec. 28, 2011

(86) PCT No.: PCT/US2011/067662
§ 371 (c)(1),
(2), (4) Date: Apr. 14, 2014

(87) PCT Pub. No.: WO2013/101002
PCT Pub. Date: Jul. 4, 2013

(65) Prior Publication Data
US 2014/0229585 A1    Aug. 14, 2014

(51) Int. Cl.
*H04L 12/24* (2006.01)
*G06F 9/445* (2006.01)
(52) U.S. Cl.
CPC ........ *H04L 41/0803* (2013.01); *G06F 9/4451* (2013.01); *G06F 9/44505* (2013.01)
(58) Field of Classification Search
CPC ..... H04L 41/0803; H04L 41/00; H04L 41/02; H04L 41/08; H04L 41/082;
(Continued)

(56) References Cited

U.S. PATENT DOCUMENTS 6,697,852 B1 *  2/2004  Ryu ..................... H04L 67/34
                                              709/203
6,735,691 B1 *  5/2004  Capps ................. G06F 9/44505
                                              713/1

(Continued)

FOREIGN PATENT DOCUMENTS

CN    102202048 A    9/2011
EP    2244440 A1    10/2010
(Continued)

OTHER PUBLICATIONS

Office Action for Japanese Patent Application No. 2014-550255, dated May 26, 2015, 2 pages of English Translation, 1 page of Japanese Office Action.

(Continued)

*Primary Examiner* — Kostas Katsikis
*Assistant Examiner* — Billy H Ng
(74) *Attorney, Agent, or Firm* — Grossman, Tucker, Perreault & Pfleger, PLLC

(57) ABSTRACT

Described herein are systems and methods for managing and distributing device and/or software settings. In some embodiments, the systems and methods permit a first device to upload settings information and/or user information to a network server. The network server may store such settings information and post it for download by at least one second device. Mechanisms for establishing a trust rating for such settings information are also described.

6 Claims, 3 Drawing Sheets

(58) Field of Classification Search
CPC ............. H04L 41/0823; H04L 41/0826; H04L 41/083; H04L 41/0833; H04L 41/0836; H04L 41/084; H04L 41/0843; H04L 41/0846; H04L 41/085; H04L 41/0869; H04L 41/0873; H04L 67/303; H04L 67/306; H04L 41/0806; H04L 41/0813; G06F 9/44505; G06F 9/4451; G01N 2035/00881; H04W 88/04
See application file for complete search history.

(56) References Cited

U.S. PATENT DOCUMENTS

| | | | |
|---|---|---|---|
| 7,822,631 B1* | 10/2010 | Vander Mey | G06F 17/30038 705/7.29 |
| 8,438,224 B1* | 5/2013 | Chirita | G06Q 30/0231 709/203 |
| 2002/0097262 A1* | 7/2002 | Iwase | H04N 1/00127 715/744 |
| 2002/0178239 A1* | 11/2002 | Kinyon | G06F 9/44505 709/220 |
| 2004/0015573 A1 | 1/2004 | Yuki et al. | |
| 2005/0240609 A1* | 10/2005 | Mizuno | H04L 67/1097 |
| 2008/0209449 A1* | 8/2008 | Maehira | G06F 9/44505 719/321 |
| 2008/0252918 A1* | 10/2008 | Nagata | H04N 1/00366 358/1.13 |
| 2009/0300431 A1 | 12/2009 | Ahn | |
| 2010/0268776 A1* | 10/2010 | Gerke | G06Q 10/10 709/204 |
| 2010/0325313 A1* | 12/2010 | Esteve Asensio | G06F 9/4451 709/246 |
| 2011/0013775 A1 | 1/2011 | Hu et al. | |
| 2011/0238743 A1* | 9/2011 | Kikuoka | H04L 67/36 709/203 |
| 2013/0110812 A1* | 5/2013 | Lakshmanan | G06F 17/30867 707/709 |

FOREIGN PATENT DOCUMENTS

| | | |
|---|---|---|
| JP | H0962704 A | 3/1997 |
| JP | H11266303 A | 9/1999 |
| JP | 200385448 A | 3/2003 |
| JP | 2006203482 A | 8/2006 |
| JP | 2008181358 A | 8/2008 |
| WO | 2008117442 A1 | 10/2008 |

OTHER PUBLICATIONS

European Search Report for Application No. 11879042.7, dated Jul. 6, 2015, 8 pages.
Chinese Office Action for Chinese Patent Application No. 201180076013.1, dated Dec. 2, 2015, 10 pages of English translation and 11 pages of Chinese Office Action.
Office Action for Japanese Patent Application No. 2014-550255, dated Feb. 17, 2015.
International Search Report and Written Opinion for PCT Patent Application No. PCT /US20 11/067 662, dated Sep. 24, 2012.
International Preliminary Report on Patentability and Written Opinion for PCT Patent Application No. PCT/US2011/067662, dated Jul. 10, 2014, 16 pages.
Office Action for China Patent Application No. 201180076013.1, dated Jun. 30, 2016, 12 pages of English translation and 9 pages of Chinese Office Action.
Office Action for Japan Patent Application No. 2015-150435, dated Jun. 28, 2016, 2 pages of English translation and 2 pages of Japanese Office Action.
Chinese Official Form of Decision on Rejection for Chinese Patent Application No. 201180076013.1, dated Nov. 4, 2016, 13 pages of English translation and 12 pages of Chinese Office Action.
Chinese Office Action issued in Chinese Application No. 201180076013.1, dated Sep. 1, 2017, with English translation, 34 pages.

* cited by examiner

SYSTEMS AND METHODS FOR THE MANAGEMENT AND DISTRIBUTION OF SETTINGS

FIELD

The present disclosure relates to the management and distribution of application and/or device settings.

BACKGROUND

Interest in computing has significantly increased in recent times. In view of this trend, the use of mobile and other electronic devices has grown exponentially. Users are leveraging such devices to perform increasingly diverse tasks, such as electronic banking, electronic mail, internet browsing, gaming, and the like. Performance of such tasks is often facilitated by an application, or "App," that is executed on a host device platform. This is particularly true in the case of mobile devices, for which thousands of applications have been developed for the purpose of performing innumerable tasks.

Users frequently update or add applications to mobile and other electronic devices, sometimes on a daily basis. It is therefore common for a single mobile or other electronic device to have many diverse applications stored and executed thereon. Such applications can include application settings that may be adjusted by a user to provide a desired level of performance, security and/or privacy protection. In addition to such application settings, a mobile or other electronic device may itself include device settings that can be adjusted by a user. While such settings can afford a high degree of customization, adjusting such settings can be difficult for many users, particularly those who are not technologically savvy. As a result many users elect to utilize default settings associated with a device and/or an application, even if such settings do not provide adequate performance and/or protection against access by unauthorized third parties.

BRIEF DESCRIPTION OF THE DRAWINGS

Features and advantages of embodiments of the claimed subject matter will become apparent from the following detailed description and the drawings, wherein like numerals depict like parts, and in which:

Although the following detailed description proceeds with reference made to illustrative embodiments, many alternatives, modifications, and variations thereof will be apparent to those skilled in the art.

DETAILED DESCRIPTION

As used herein, the term "mobile device" means any of a wide variety of portable electronic devices, including but not limited to cell phones, electronic readers, handheld game consoles, mobile internet devices, portable media players, personal digital assistants, smart phones, ultra-mobile PCs, netbooks and notebook computers.

The phrase, "other electronic devices" is used herein to broadly refer to the wide swath of electronic devices that may be used to upload or otherwise deliver settings information to a network server, but which may not fall into the narrower (but still broad) purview of a mobile device. Non-limiting examples of other electronic devices include automated teller machines (ATM's), desktop computers, wireless access points, routers, hubs, bridges, network printers, wired telephones, kiosks, and public computer terminals.

The terms, "manage" and "management" when used in connection with one or more settings (e.g., device settings, privacy settings, application settings, security settings, and the like), mean the modification of one or more of such settings, through direct input by a user and/or download of settings information from an external source. As will be described in detail below, settings management may be initiated and/or conducted using mobile or other electronic devices, as defined above. In some embodiments, settings management is initiated using a mobile device.

The letter "n" is occasionally used herein as a subscript in connection with one or more elements described in the accompanying figures. In such instances, it should be understood that n is a non-zero integer. Thus for example the expression "element $X_n$" should be interpreted as indicating that one ($X_1$) or a plurality element X's can be present. Accordingly, n may equal 1, 2, 3, 4 . . . 100 . . . 1000 . . . 10000 . . . or more, including all positive integer values between and/or above the aforementioned numbers. It should therefore be understood that while the present disclosure may refer to an element in the singular, e.g., element $X_n$, such expressions should be interpreted as also encompassing the plural form.

Figure 1:
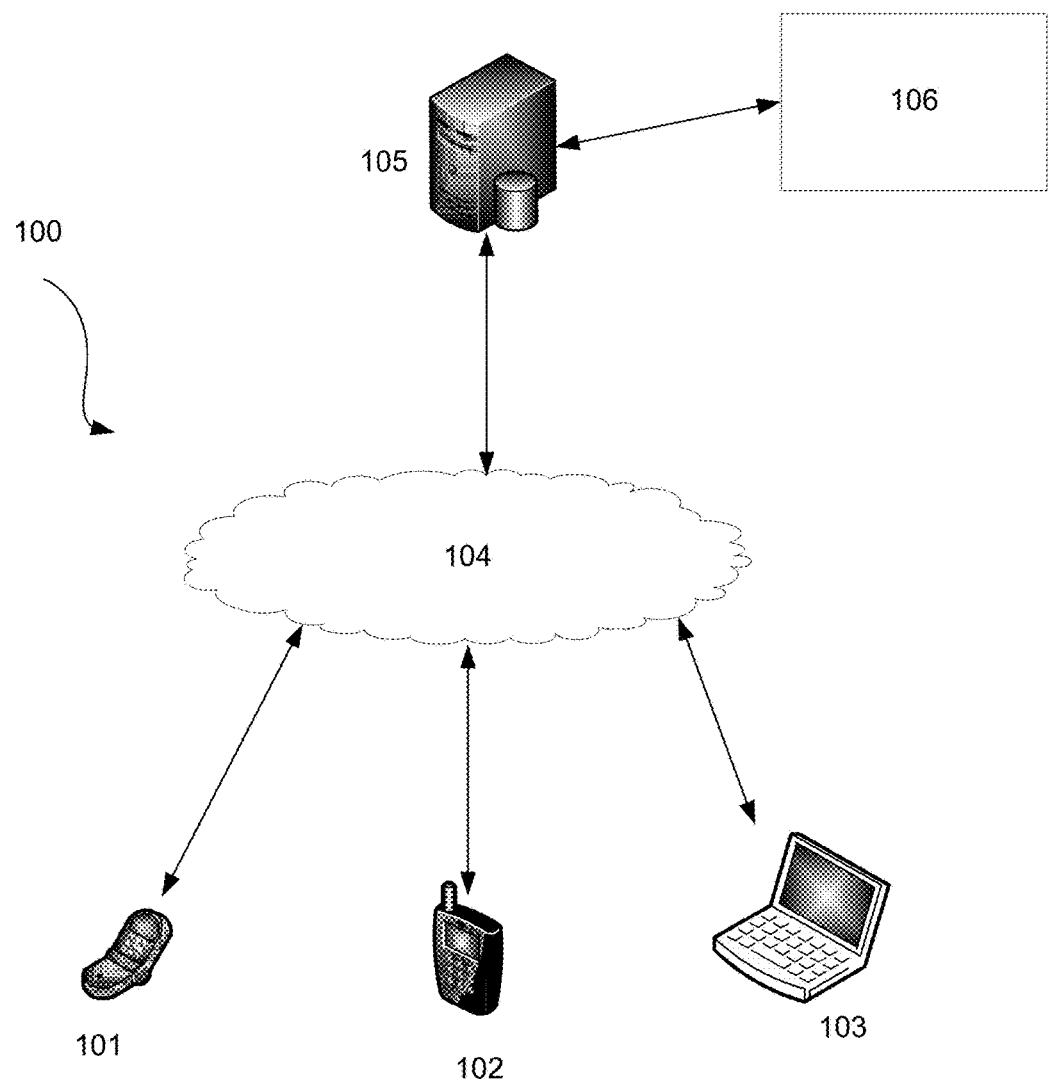
FIG. 1 illustrates exemplary system overview consistent with non-limiting embodiments of the present disclosure.

One aspect of the present disclosure relates to systems and methods for managing and/or distributing settings on mobile and other electronic devices. Reference is therefore made to FIG. 1, which illustrates an exemplary system overview consistent with the present disclosure. System 100 includes devices 101, 102, and 103. Each of devices 101, 102, 103 may bi-directionally communicate with server 105 via network 104. Cloud server includes or is communication with network storage 106.

Devices 101, 102, 103 may include at least one mobile or other electronic device, as defined above. In some embodiments, devices 101, 102, 103, include at least one mobile device. In further non-limiting embodiments, devices 101, 102, 103 include at least one mobile phone, at least one smart phone, and combinations thereof. While FIG. 1 depicts the use of three devices (i.e., device 101, 102, 103) it should be understood that any number of mobile or other electronic devices may be included in the systems and methods of the present disclosure.

Network 104 may be any network that carries data. As examples of suitable networks that may be used as network 104 in accordance with the present disclosure, non-limiting mention is made of the internet, private networks, virtual private networks (VPN), public switch telephone networks (PSTN), integrated services digital networks (ISDN), digital subscriber link networks (DSL), wireless data networks (e.g., cellular phone networks), combinations thereof, and other networks capable of carrying data. In some non-limiting embodiments, network 102 includes at least one of the internet, at least one wireless network, and at least one cellular telephone network.

Network server 105 may be executed on a single server machine or a number of server machines, which may be co-located or distributed geographically. In operation, network server 105 receives settings information from one or more of devices 101, 102, 103 via network 104. Without limitation, such settings information can include device settings, application settings, driver settings, security settings, privacy settings, internet content settings, parental control settings, network settings (e.g., firewall settings), electronic mail settings, combinations thereof, and the like. Of course, network server 105 may receive other information relevant to settings associated with a mobile or other electronic device (or applications executed thereon). For example, network server 105 may receive information such as device type, device make and model, device hardware information (e.g., processor speed, memory, supplemental processing capability (e.g., graphics processing unit), and the like), application name, application version number, operating system type, combinations thereof, and the like.

In addition to settings information, network server 105 can receive information regarding the user of a device from which settings information is received (hereafter, "user information"). Such user information may include, for example, a user name, information regarding the technical proficiency and/or experience level of a user in one or more fields, such as security, privacy, computer science, another technical field or a combination thereof. Similarly, user information may include affiliated groups a user has opted to associate with. Network server 105 may use this and other information to establish one or more user profiles corresponding to a user from which settings information is received. Network server 105 may also associate such user profile(s) with settings information uploaded by a user affiliated with such profile(s).

Network server 105 may store settings information and user information in network storage 106, e.g., as one or more files. Network storage 106 can include at least one memory (not shown) that is suitable for storing such information. Non-limiting examples of memory that may be used as and/or within network storage include semiconductor firmware memory, programmable memory, non-volatile memory, read only memory, electrically programmable memory, random access memory, flash memory (which may include, for example, NAND or NOR type memory structures), magnetic disk memory, and/or optical disk memory. Additionally or alternatively, network storage 106 may include other and/or later-developed types of computer-readable memory. Network storage 106 may be local to network server 105, external to network server 105, or a combination thereof.

The systems of the present disclosure may include one or more computer readable media having settings distribution instructions stored thereon, which when executed by a processor cause the processor to perform settings distribution operations consistent with the present disclosure. Such settings distribution instructions may be stored in a memory that is local or external to network server 105, such as network storage 106. Similarly, settings distribution instructions may be executed by a processor that is local or external to network server 105. In some embodiments, settings distribution instructions are stored on network storage 106 and executed by a processor local to network server 105.

In some embodiments, network server 105 may be further configured to facilitate the distribution (e.g., downloading) of settings information stored on network storage 106 by one or more mobile or other electronic devices. For example, a user of device 101 may upload settings information to network server 105 via network 104. Network server 105 may then store such settings information on network storage 106, e.g., as a settings file. Network server 105 can also associate that settings file with a user profile corresponding to the user of device 101. Network server 105 may further post or otherwise present the stored settings file in a manner that may be identified and downloaded by a mobile or other electronic device, such as device 102 and/or device 103.

In some embodiments, network server 105 may populate a database with settings information uploaded by one or more users, and use that database to facilitate the download of such settings by one or more users. For example network server may post graphical indicia such as links, radio buttons, tabular information, and the like which are associated with settings information (e.g., one or more settings files) stored on network storage 106. Such graphical indicia may be viewed with a web browser (e.g., as part of a website), with an in-application settings selection mechanism displayed within an application executed on a host mobile or other electronic device (e.g., as a table, one or more radio buttons, combinations thereof, and the like), a combination thereof, and the like. In some embodiments these graphical indicia can be presented to a user interested in downloading the settings information associated therewith, e.g., as instructions that enable the user to mirror or otherwise implement the settings information on their device or application. Such instructions can be useful when a device or application cannot accept changes to multiple settings in batch format.

In some embodiments, a user action (e.g., a click, a touch, etc.) on a respective graphical indicia may initiate a download operation, during which settings information (e.g., a settings file) associated with that respective graphical indicia is transferred from network storage 106 to a mobile or other electronic device via network 104. In this way, a user of a mobile or other electronic device (e.g., devices 102, 103 in FIG. 1) may browse settings information uploaded to network server 105 by other devices (e.g., device 101), and download desired settings information to their own device. In some embodiments, a device and/or application executed on a device can perform a compatibility check to determine whether the settings information being downloaded is of the correct type and/or version for the device/application in question.

Figure 2:
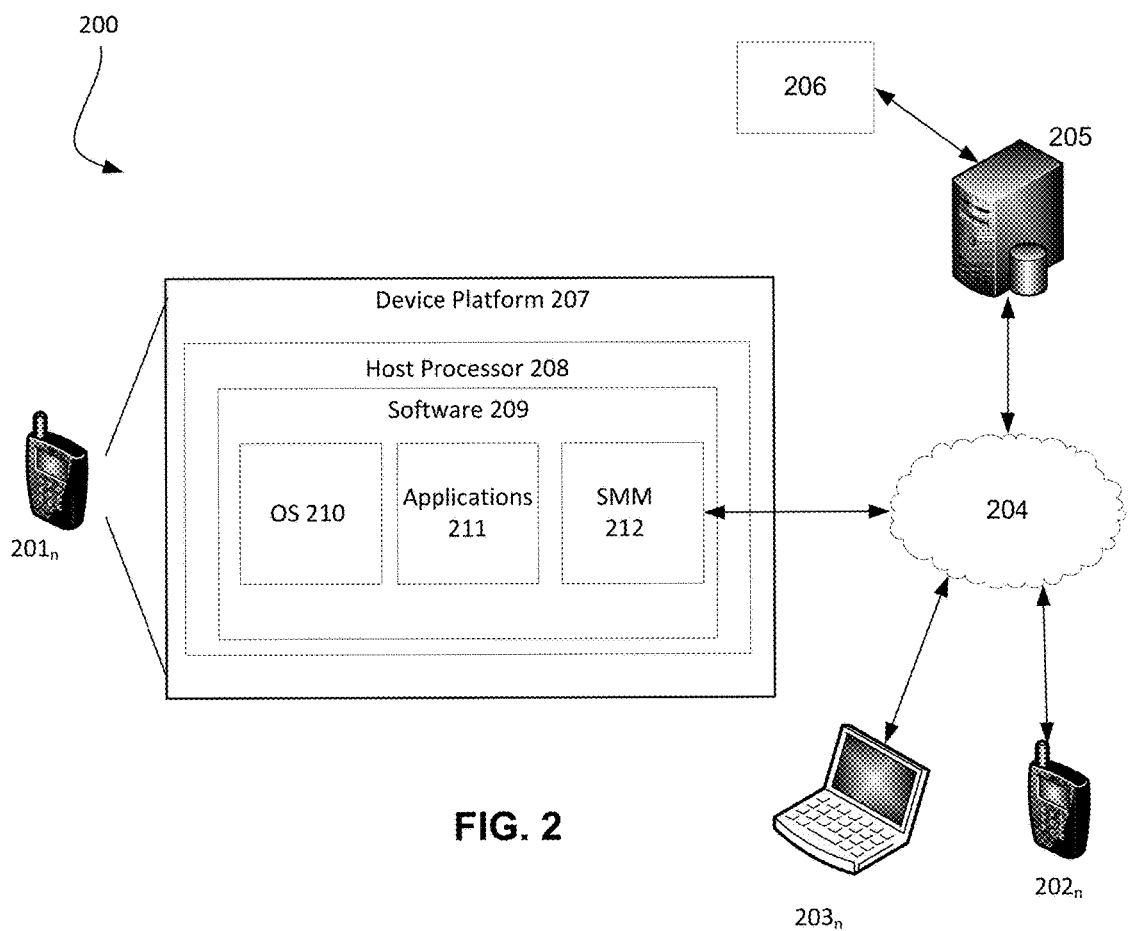
FIG. 2 illustrates exemplary device platform architecture consistent with non-limiting embodiments of the present disclosure.

FIG. 2 is a block diagram illustrating exemplary device platform architecture consistent with the present disclosure. As shown, system 200 includes devices $201_n$, network 204, network server 205, and network storage 206. Such components generally correlate to elements 100-106 in FIG. 1, and so a description of the nature and function of such components is not explicitly described with respect to FIG. 2. Rather, FIG. 2 is used herein to provide additional detail regarding an exemplary device platform that may be used in mobile and other electronic devices consistent with the present disclosure.

In this regard, device $201_n$ includes at least one device platform 207. Device platform 207 may be a device platform correlating to one or more mobile or other electronic devices such as those described above. While a single device $201_n$ is depicted in the non-limiting example shown in FIG. 2, it should be understood that any number of devices may be used in system 200.

Device platform 207 includes at least one host processor 208 running software 209, such as for example operating system (OS) 210 and applications 211. In addition, software 209 may include settings manager module 212 ("SMM 212"). Generally, and as shown in FIG. 2, SMM 212 is a software component that may reside within and/or be executed from a memory (not shown) of device $201_n$. SMM 212 may be executed by a processor as an independent application on device platform 207. Alternatively, SMM 212 may be configured as a program that is run within the context of other software executed by host processor 208. Thus for example, SMM 212 may be an application that is run within operating system 210. Likewise, SMM 212 may be a web-based application, i.e., an application run within a host web browser. For example, SMM 212 may be provided as website code that is executed and/or read by a web browser. Regardless of its nature, SMM 212 may be understood to provide an interface through which users of device $201_n$ may input settings information, modify settings information, send settings information, receive settings information, or a combination thereof.

Settings management may be initiated by device $201_n$, through SMM 212, which functions to facilitate the modification of one or more device or application settings associated with device $201_n$. For example, SMM 212 can provide a graphical user interface to display various device settings that may be adjusted by a user to adjust the performance and/or useability of device $201_n$. SMM 212 may also provide a graphical user interface to display application settings that may be adjusted by a user to customize one or more aspects of software 209 executed by host processor 208. For example, SMM may display settings associated with one or more of OS 210 and applications 211.

SMM 212 may further allow one or more settings to be managed on a host device. In some embodiments, settings adjustments made through SMM 212 may be automatically applied to the relevant components of device $201_n$ and/or software 209. In this way, SMM 212 can provide a centralized location from which device and application settings may be managed on a host device.

SMM 212 may also facilitate the upload of device and/or application settings to network server 205. By way of example, SMM 212 may provide a graphical user interface through which settings information, user information, or a combination thereof may be inputted. Once inputted, SMM 212 may cause device $201_n$ to store such information, e.g., in one or more files. Alternatively or additionally, SMM 212 may cause device $201_n$ to upload settings information (optionally in the form of one or more files) to network server 205. Network server may then store the received information on network storage 206 and facilitate browsing and distribution of such information as discussed above in connection with network server 105 in FIG. 1.

SMM 212 may also facilitate the browsing and downloading of settings information stored in network storage 206. In this regard, SMM 212 may provide a graphical user interface that permits a user of device of $201_n$ to browse settings information stored on network storage 206. For example, SMM 212 may include a web browser that is capable of displaying a website populated with settings information by network server 205, as discussed above. Alternatively or additionally, SMM 212 may be leveraged as a resource by one or more applications, and provide an in-application graphical user interface capable of browsing settings information stored on network storage 206. In any case, SMM 212 can allow a user to browse, select and download settings information stored on network storage 206 to device $201_n$.

Although FIG. 2 only illustrates an exemplary device platform for device $201_n$, it should be understood that devices $202_n$ and $203_n$ may include the same or similar elements as device platform 207 of device $201_n$. Thus, devices $202_n$ and $203_n$ may also be capable of at least one of managing local application and device settings, uploading settings and/or user information to network server 205, browsing settings information stored on network storage 206, and downloading settings information from network storage 206.

In addition or as an alternative to SMM 212, the present disclosure contemplates other mechanisms for uploading, browsing, and/or downloading settings information to one or more mobile or electronic devices. In some embodiments, the systems described herein include an interface that allows settings information and user information to be input directly to network server 205, without the use of an SMM. In some embodiments, for example, a user may input settings information and/or user information to network server 205 via a web browser. As may be appreciated, the web browser in such embodiments need not be executed on a platform associated with the settings information being inputted.

Thus, for example, a cell phone user may use a cell phone web browser to input and upload device settings to network server 205, where the device settings relate to another type of mobile or other electronic device, such as a tablet computer, a desktop computer, or the like. Similarly, a web browser on a device executing the MAC OS® may be used to input application settings for software that designed for execution on another OS, such as Microsoft WINDOWS®, ANDROID® and the like.

In some embodiments, network server 205 may be configured to permit indirect downloading of settings information. As used herein, the terms "indirect download" and "indirect downloading" are used interchangeably herein to refer to downloads that are initiated by a first device but which are completed by one or more second devices. Thus, for example, a first device (e.g., a cell phone, a smart phone, etc.) may be used to browse settings information stored on network storage 206, and select settings information for download by/to a second device (e.g., another cell phone, another smart phone, a tablet, etc.).

In such embodiments, network server 205 may automatically push the selected settings information to the one or more second devices. Alternatively or additionally, network server may notify such second devices of a selected download, and prompt a user of a second device to initiate the download of settings information. For example, network server may notify a second device of a potential download of settings information using one or more phone calls, text messages, push notifications, update alerts, instant messages, combinations thereof, and the like. The download of settings information to the second device may then be completed upon receiving confirmation of such download through a second device.

In some embodiments, network server 205 is configured to establish a trust rating associated with settings information and user information stored on network storage 206. Such a trust rating may be established using one or more direct mechanisms, indirect mechanisms, and/or hybrid direct/indirect mechanisms.

In the direct mechanisms, network server 205 may provide a mechanism by which users that download settings information may rate the usefulness and/or effectiveness of such settings information as implemented on their device/application. By way of example, network server 205 may allow users to assign a rating of zero to five stars (or some other indicia). In such instances, a rating of five stars may be considered excellent and a rating of zero stars may be considered poor, or vice versa. Of course, the use of a star rating system is exemplary only, and other rating systems may be used.

Although an overall rating system is contemplated, in some embodiments such a system may enable users to rate multiple aspects of settings information. For example, network server 205 may allow users to rate the stability of settings information, impact on performance, impact on security, whether settings information contained and/or exposed the user's device to malware, combinations thereof, and the like. Other information regarding users that download settings information may also be collected, such as the user's self-rated level of experience/expertise in security, computer science, or another technical field. Such user information may be displayed in association with a rating posted by such user. As a result, a user viewing a rating can evaluate the rating in the context of such user information.

As a particular piece of settings information is rated by users over time, a trust rating may be established by network server 205 from such user ratings. For example, network server may use an aggregate (e.g., an average) of such user ratings to establish a trust rating. Alternatively or additionally, network server 205 may calculate a trust rating using an algorithm that takes user ratings into account.

In the indirect mechanisms, network server 205 may track information that may be considered an indirect indicator of the trustworthiness of a particular piece of settings information. For example, network server may track how many times a piece of settings information has been downloaded (either by unique or gross users) and/or how many times users that have downloaded a piece of settings information have subsequently downloaded other settings information related to the same application and/or device. In the former case, a large number of downloads may be considered a positive indicator of trustworthiness, whereas the opposite may be considered indicative of less trustworthy settings information. In the latter case, data showing that few users who download a particular piece of settings information subsequently download other settings information relating to the same application and/or device may be considered a positive indicator of trustworthiness, whereas the opposite may be considered indicative of less trustworthy settings information. Additionally or alternatively, network server 205 may track how many times the same or similar settings information for a particular device or software has been uploaded. Many uploads of the same or similar settings information may be considered a positive indicator of trustworthiness, whereas the opposite may be indicative of less trustworthy settings.

In the hybrid mechanisms, network server 205 may use a combination of the direct and indirect mechanisms described above to determine a trust rating. For example, network server may input ratings and download data into an algorithm that weights such components in a manner that produces a result representative of the trustworthiness of a particular piece of settings information.

Such hybrid mechanisms may therefore be useful to avoid or otherwise address false positive or negative trustworthiness ratings that may be generated by direct and/or indirect mechanisms alone. For example, when a piece of settings information has been downloaded only a few times, an indirect mechanism of determining trust as described above may ascribe a negative trust rating to such settings information. If the settings information was rated positively by downloading users however, such positive ratings can be used in the hybrid mechanism to offset the negative trust rating that would have been generated using an indirect mechanism alone.

Regardless of the manner in which a trust rating is generated, network server 205 may be configured to cause graphical indicia correlating to such trust rating to be displayed in conjunction with corresponding graphical indicia of settings information. In this way, users browsing settings information stored on network storage 206 (e.g., using a web browser) may determine which settings information is considered to be trustworthy or untrustworthy.

Although the foregoing description has described embodiments in which a user browses and selects settings information for download from network storage, such user interaction is not required. In some embodiments of the present disclosure, devices that include or otherwise support a settings management module may automatically download the most trusted settings information for that device and/or software executed thereon. In this way, a seamless user experience may be created wherein most trusted settings are automatically downloaded from network storage 206 and implemented on a host device without (or with minimal) user interaction.

Figure 3:
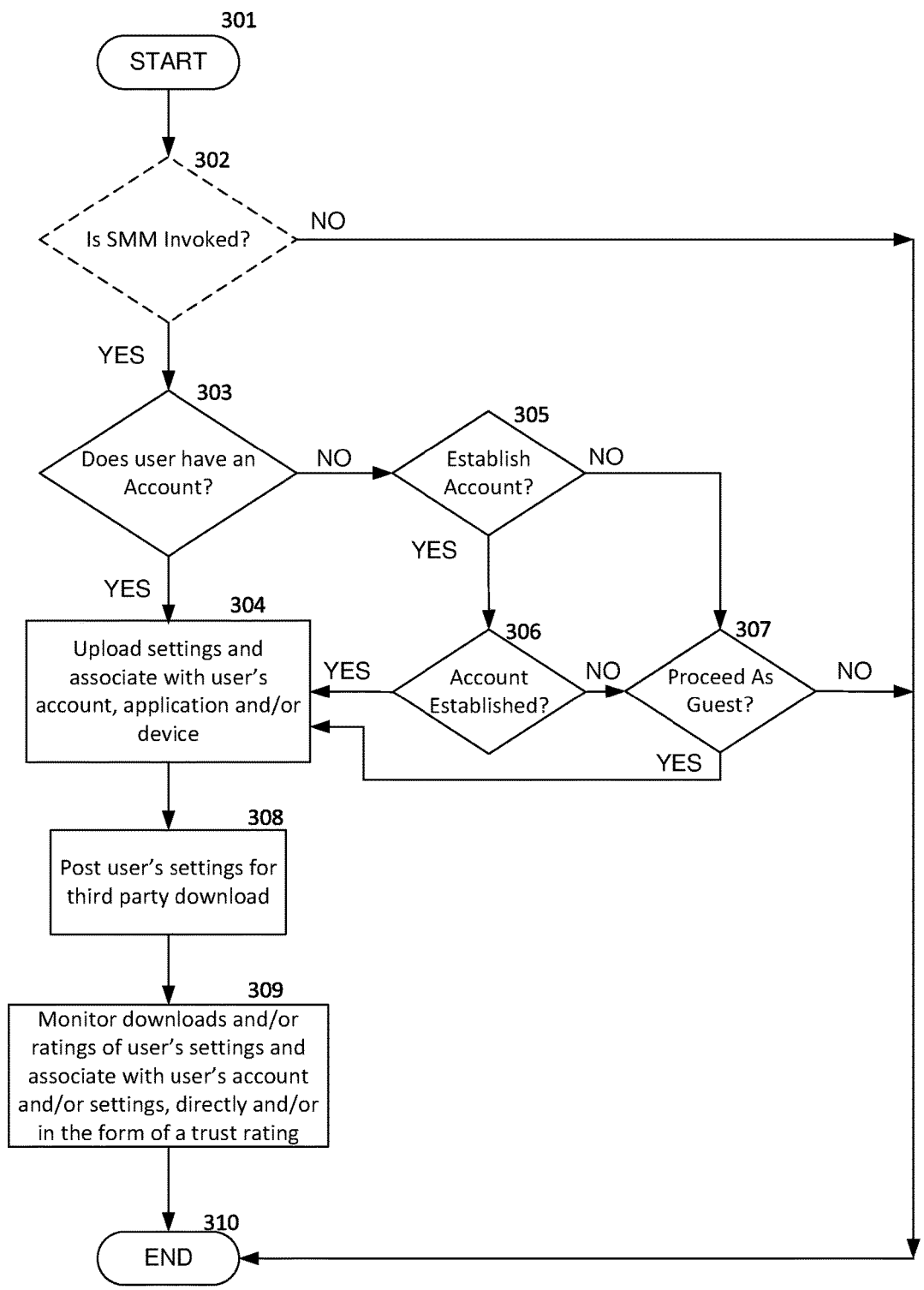
FIG. 3 is a flow diagram illustrating an exemplary method of managing and distributing device and/or application settings consistent with non-limiting embodiments of the present disclosure.

Another aspect of the present disclosure relates to methods for uploading and distributing settings information. Reference is therefore made to FIG. 3, which is a flow diagram illustrating an exemplary method consistent with the present disclosure.

As shown, the method beings at block 301. At optional block 302, a determination may be made as to whether a settings management module (SMM) is invoked. As may be appreciated, such step may only be necessary in instances where a network server is configured to only accept downloads via an SMM. As discussed above, a network server may be configured to receive settings information without the use of an SMM, e.g., through a web browser. In such embodiments, block 302 may be skipped, and the method may proceed to block 303. If an SMM is utilized, however, the method may proceed to block 303 if the SMM is invoked (e.g., on a mobile or other electronic device), otherwise the method may halt.

At block 303, a determination may be made as to whether a user initiating the upload of settings information has an account, e.g., with a settings management system or other service executed on a network server. If the user does not have an account, the method may proceed to block 305, where a determination may be made as to whether the user wishes to establish an account. As the present disclosure contemplates methods in which settings information may be uploaded anonymously, the establishment of an account is not required, in which case the method may proceed to block 307. At block 307, a determination may be made as to whether to proceed with an upload of settings information with the user recognized as a guest. If so, the process may proceed to block 304. If not, the process may halt.

If pursuant to block 305 it is determined that a user account will be established, the method may proceed to block 306. At block 306, a network server may collect information necessary to establish a user account and/or profile, such as the user information described above. In addition, the network server may establish a username and password affiliated with the user profile. In any case, a determination may be made in block 306 as to whether a user account has been successfully established. If account establishment was unsuccessful, the method may proceed to block 307 and continue as described above. If account establishment is successful, than the method may proceed to block 304.

At block 304, settings information relating to a device and/or application may be uploaded to a network server. In instances where an account has been established, network server may associate the uploaded settings information with user information in the account, as described above. The method may then proceed to block 308, wherein network server may post the uploaded settings for third party download.

As should be understood from the foregoing, the systems and methods of the present disclosure can provide a convenient mechanism for managing and distributing device and software settings. Moreover, the described systems and methods can alleviate the burden on community experts to create and distribute settings among multiple devices.

Other embodiments of the present disclosure will be apparent to those skilled in the art from consideration of the specification and practice of the inventions disclosed herein. It is intended that the specification be considered as exemplary only, and as illustrative of non-limiting embodiments of the invention as indicated by the following claims.

What is claimed is:

1. At least one non-transitory computer readable medium having settings management instructions stored thereon, wherein said instructions when executed by a processor of a network server cause the network server to perform the following operations comprising:
    receive settings information from a first device, wherein said settings information correlates to settings associated with at least one of said first device and software including an application executed on said first device;
    receive user information from said first device, said user information comprising an experience level of a user of said first device, a technical proficiency of said user of said first device, or a combination thereof;
    store said settings information and said user information in a network storage;
    generate a user profile for said user of said first device based at least in part on said user information;
    associate said user profile with said settings information;
    generate at least one direct indicator of trustworthiness comprising a rating of said settings information received from said first device;
    generate at least one indirect indicator of trustworthiness of said settings information, the at least one indirect indicator of trustworthiness comprising at least one of:
    a number of times said settings information has been downloaded; or
    a number of times users that have downloaded said settings information have subsequently downloaded other settings information related to the same application, the same first device, or a combination thereof;
    monitor the direct and indirect indicators of trustworthiness;
    establish a trust rating based on the direct and indirect indicators of trustworthiness;
    associate said trust rating with the direct and indirect indicators of trustworthiness; and
    post said settings information in a settings file for download by a second device, wherein the settings file is configured such that when it is downloaded by the second device, it causes the second device to automatically implement the settings information therein without interaction by a user of the second device.

2. The at least one non-transitory computer readable medium of claim 1, wherein said settings information comprises at least one of a device setting, an application setting, a driver setting, a security setting, a privacy setting, a network setting, an electronic mail setting, and combinations thereof.

3. A system, comprising:
    at least one mobile device comprising:
    a hardware processor;
    a memory; and
    settings management logic executed on said processor, wherein said settings management logic is operable to cause said mobile device to:
    receive settings information inputs, wherein settings information inputs comprises settings information correlating to settings associated with at least one of said mobile device and software including an application executed on said mobile device;
    receive user information regarding a user of said mobile device, said user information comprising an experience level of said user, a technical proficiency of said user, or a combination thereof;
    store said settings information inputs and said user information to said memory; and
    cause said mobile device to transmit said settings information and said user information to a network server, so as to cause said network server to:
    store said settings information and said user information in a network storage, generate a user profile for said user of said mobile device based at least in part on said user information,
    associate the user profile with the settings information,
    post the settings information in a settings file for download, wherein the settings file is configured such that, when it is downloaded by a second device, it causes the second device to automatically implement the settings information therein without interaction by a user of the second device,
    generate at least one direct indicator of trustworthiness comprising a rating of said settings information,
    generate at least one indirect indicator of trustworthiness of said settings information, the at least one indirect indicator of trustworthiness comprising at least one of:
    a number of times said settings information has been downloaded; or
    a number of times users that have downloaded said settings information have subsequently downloaded other settings information related to the same application, the same mobile device, or a combination thereof;
    monitor the direct and indirect indicators of trustworthiness;
    establish a trust rating based on the direct and indirect indicators of trustworthiness, and
    associate said trust rating with the direct and indirect indicators of trustworthiness;
    wherein said settings management logic is further operable to enable browsing and downloading of settings files stored on said network storage with said mobile device.

4. The system of claim 3, wherein said settings information comprises at least one of a device setting, an application setting, a driver setting, a security setting, a privacy setting, a network setting, an electronic mail setting, and combinations thereof.

5. A method, comprising:
receiving, with a network server, settings information from a first device, said settings information correlates to settings associated with at least one of said first device and software including an application executed on said first device;
receiving, with said network server, user information from said first device, said user information comprising an experience level of a user of said first device, a technical proficiency of said user of said first device, or a combination thereof;
storing said settings information and said user information in a network storage;
generating, with said network server, a user profile for said user of said first device based at least in part on said user information;
associating, with said network server, said user profile with said settings information;
posting, with said network server, said settings information in a settings file for download by a second device, wherein the settings file is configured such that when it is downloaded by the second device, it causes the second device to automatically implement the settings information therein without interaction by a user of the second devices;
generating at least one direct indicator of trustworthiness comprising a rating of said settings information, generating at least one indirect indicator of trustworthiness of said settings information, the at least one indirect indicator of trustworthiness comprising at least one of:
a number of times said settings information has been downloaded; or
a number of times users that have downloaded said settings information have subsequently downloaded other settings information related to the same application, the same first device, or a combination thereof;
monitoring the direct and indirect indicators of trustworthiness;
establishing a trust rating based on the direct and indirect indicators of trustworthiness; and
associating said trust rating with the direct and indirect indicators of trustworthiness.

6. The method of claim 5, wherein said settings information comprises at least one of a device setting, an application setting, a driver setting, a security setting, a privacy setting, a network setting, an electronic mail setting, and combinations thereof.

* * * * *